United States Patent
Liu et al.

(10) Patent No.: US 11,157,313 B2
(45) Date of Patent: Oct. 26, 2021

(54) METHOD, APPARATUS AND COMPUTER STORAGE MEDIUM FOR CONTROLLING A STORAGE SYSTEM

(71) Applicant: EMC IP Holding Company LLC, Hopkinton, MA (US)

(72) Inventors: Joe Jian Liu, Beijing (CN); Chen Gong, Beijing (CN); Chao Han, Beijing (CN); Huan Chen, Beijing (CN); Lester Zhang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 163 days.

(21) Appl. No.: 16/172,117

(22) Filed: Oct. 26, 2018

(65) Prior Publication Data

US 2019/0129750 A1    May 2, 2019

(30) Foreign Application Priority Data

Oct. 27, 2017    (CN) .......................... 201711031541.0

(51) Int. Cl.
*G06F 9/48* (2006.01)
*G06F 3/06* (2006.01)
(Continued)

(52) U.S. Cl.
CPC ............ *G06F 9/4881* (2013.01); *G06F 3/061* (2013.01); *G06F 3/067* (2013.01); *G06F 3/0608* (2013.01); *G06F 3/0644* (2013.01); *G06F 3/0653* (2013.01); *G06F 3/0665* (2013.01); *G06F 9/48* (2013.01); *G06F 9/4887* (2013.01); *G06F 9/50* (2013.01); *G06F 9/505* (2013.01);
(Continued)

(58) Field of Classification Search
None
See application file for complete search history.

(56) References Cited

U.S. PATENT DOCUMENTS 8,327,103 B1    12/2012  Can et al.
8,930,653 B1 *  1/2015  Chatterjee ............. G06F 3/0619
                                                    711/162

(Continued)

OTHER PUBLICATIONS

Choudhary, Gyanesh Kumar, et al.; "Techniques for Efficiently Performing Filesystem Reorganization Tasks for Different Filesystems;" U.S. Appl. No. 15/394,601, filed Dec. 29, 2016.

(Continued)

*Primary Examiner* — Lewis A Bullock, Jr.
*Assistant Examiner* — Mark A Gooray
(74) *Attorney, Agent, or Firm* — BainwoodHuang (57) ABSTRACT

Embodiments of the present disclosure provide a method, and apparatus and a computer readable medium for controlling a storage system. For example, a method for controlling a storage system is provided. The method comprises: determining a control factor related to a background operation in the storage system, the control factor including a usage state of a storage resource pool in the storage system; setting a priority level for the background operation based on the determined control factor; and controlling execution of the background operation based on the set priority level. Embodiments of the present disclosure may accelerate execution of background operations, improve resource utilization efficiency, and ensure good I/O performance.

13 Claims, 5 Drawing Sheets

(51) Int. Cl.
  *G06F 11/34*  (2006.01)
  *G06F 11/30*  (2006.01)
  *G06F 9/50*   (2006.01)

(52) U.S. Cl.
  CPC .......... *G06F 11/3034* (2013.01); *G06F 11/34* (2013.01); *G06F 11/3433* (2013.01); *G06F 11/3485* (2013.01); *G06F 2201/81* (2013.01); *G06F 2209/486* (2013.01)

(56) References Cited

U.S. PATENT DOCUMENTS

| | | |
|---|---|---|
| 10,365,978 B1 | 7/2019 | Whitney et al. |
| 10,552,322 B2 | 2/2020 | Hu et al. |
| 2005/0240934 A1* | 10/2005 | Patterson .............. G06F 3/0613 718/105 |
| 2016/0092272 A1* | 3/2016 | Karaje ................. G06F 9/5011 718/104 |
| 2016/0335283 A1* | 11/2016 | Rabinovich ............. G06F 16/17 |
| 2017/0168871 A1* | 6/2017 | Du ........................ G06F 9/4881 |
| 2019/0324947 A1 | 10/2019 | Lv et al. |
| 2019/0332326 A1 | 10/2019 | Lv et al. |
| 2019/0384743 A1 | 12/2019 | Lv et al. |

OTHER PUBLICATIONS

Puhov, Peter, et al.; "Fast Object Snapshot Via Background Processing;" U.S. Appl. No. 15/662,483, filed Jul. 28, 2017.

\* cited by examiner

METHOD, APPARATUS AND COMPUTER STORAGE MEDIUM FOR CONTROLLING A STORAGE SYSTEM

RELATED APPLICATIONS

This application claim priority from Chinese Patent Application Number CN 201711031541.0, filed on Oct. 27, 2017 at the State Intellectual Property Office, China, titled "METHODS, APPARATUSES AND COMPUTER STORAGE MEDIUM FOR CONTROLLING A STORAGE SYSTEM" the contents of which is herein incorporated by reference in its entirety.

FIELD

Embodiments of the present disclosure generally relate to a data storage system, and more specifically to methods, apparatuses and computer storage medium for controlling a background operation in a storage system.

BACKGROUND

In a storage system, there exist different types of background operations. For example, snap is a common background operation, and it is for example a version file created in a container based file system (CBFS). Furthermore, snapping technology may implement Redirect-On-Write based on unity snapshot. Typical user scenarios of snap include Virtual Device Interface (VDI), virtual servers, replication, or Virtual Machine (VM) snap for Virtual Volume (vVol). Customers usually delete unnecessary snaps to reclaim space, and snap deletion is completed through a background operation. However, many current background operations affect the performance of the storage system and thereby affect the user's experience.

SUMMARY

Embodiments of the present disclosure provide a method, an apparatus and a computer storage medium for controlling a background operation.

According to a first aspect of the present disclosure, there is provided a method for controlling a storage system. The method comprises: determining a control factor related to a background operation in the storage system, the control factor including a usage state of a storage resource pool in the storage system; setting a priority level for the background operation based on the determined control factor; and controlling execution of the background operation based on the set priority level.

In an embodiment, the control factor may further comprise at least one of a system-level load of the storage system and load of a file system associated with the storage system.

In another embodiment, the background operation may comprise snap deletion.

In a further embodiment, executing the background operation based on the set priority level may comprise: determining at least one of the number of threads for the background operation and scheduling information based on the priority level; and controlling execution of the background operation based on the determined at least one of the number of threads for the background operation and scheduling information. In a further embodiment, the scheduling information may include at least one of the following: scheduling interval for the background operation, and times of the background operation yielding a central processing unit (CPU).

In some embodiment, setting a priority level for the background operation may comprise: reducing the priority level of the background operation in response to the control factor indicating a free degree of a storage resource pool is above a threshold degree; and maintaining or increasing the priority level of the background operation in response to the control factor indicating the free degree of the storage resource pool is below the threshold degree.

In another embodiment, setting a priority level for the background operation may comprise: reducing the priority level of the background operation in response to the control factor indicating that an input/output (I/O) load of the storage system is above a threshold load; and maintaining or increasing the priority level of the background operation in response to the control factor indicating the I/O load of the storage system is below the threshold load.

In another embodiment, setting a priority level for the background operation may comprise: reducing the priority level of the background operation in response to the control factor indicating that a ratio of the current I/O load of the storage system to I/O load in a previous time period is above a first threshold ratio; and maintaining or increasing the priority level of the background operation in response to the control factor indicating the ratio of the current I/O load of the storage system to I/O load in the previous time period is below the first threshold ratio.

In some embodiments, setting a priority level for the background operation may comprise: reducing the priority level of the background operation in response to the control factor indicating that I/O response time of the storage system is above a threshold time; and maintaining or increasing the priority level of the background operation in response to the control factor indicating the I/O response time of the storage system is below the threshold time.

In another embodiment, setting a priority level for the background operation may comprise: reducing the priority level of the background operation in response to the control factor indicating that a ratio of the current I/O response time of the storage system to I/O response time before the background operation begins is above a second threshold ratio; and maintaining or increasing the priority level of the background operation in response to the control factor indicating the ratio of the current I/O response time of the storage system to the I/O response time before the background operation begins is below the second threshold ratio.

In a further embodiment, setting a priority level for the background operation may comprise: reducing the priority level of the background operation in response to the control factor indicating that a free degree of a log of the file system associated with the storage system is below a first threshold free degree; and maintaining or increasing the priority level of the background operation in response to the control factor indicating that the free degree of the log of the file system is above the first threshold free degree.

In some embodiments, setting a priority level for the background operation may comprise: reducing the priority level of the background operation in response to the control factor indicating that a free degree of data cache in the storage system is below a second threshold free degree; and maintaining or increasing the priority level of the background operation in response to the control factor indicating that the free degree of the data cache in the storage system is above the second threshold free degree.

In another embodiment, setting a priority level for the background operation may comprise: reducing the priority level of the background operation in response to the control factor indicating that a weighted sum of the free degree of the data cache in the storage system and the free degree of the log of the file system associated with the storage system is below a threshold sum; and maintaining or increasing the priority level of the background operation in response to the control factor indicating that the weighted sum is above the threshold sum.

In another embodiment, setting a priority level for the background operation may comprise setting the priority level for the background operation further based on a predetermined lowest priority level for the background operation.

In another embodiment, setting a priority level for the background operation may comprise: if the free degree of the storage resource pool is below a threshold degree, setting the priority level of the background operation to be higher than the priority level of I/O; and if the free degree of the storage resource pool is above the threshold degree, reducing the priority level of the background operation, and gradually adjusting the priority level for the background operation based on at least one of the I/O load of the storage system, the I/O response time, the free degree of the log of the file system associated with the storage system, and the lowest priority level for the background operation, to determine the priority level for the background operation.

According to a second aspect of the present disclosure, there is provided an electronic device for controlling a storage system. The electronic device comprises at least one processor, and at least one memory. The memory is coupled to the at least one processor and includes computer program codes stored therein. The computer program, when executed by the at least one processor, enables the electronic device to perform the method according to the first aspect of the present disclosure.

According to a third aspect of the present disclosure, there is provided a computer storage medium with computer program codes stored thereon which, when executed by a processor, enables the processor to perform the method according to the first aspect of the present disclosure.

Although drawings illustrate specific embodiments in an exemplary way, it should be appreciated that depictions of specific embodiments herein are not intended to limit the embodiments to the disclosed specific forms.

BRIEF DESCRIPTION OF THE DRAWINGS

From the disclosure and claims below, objects, advantages and other features of the present disclosure will be made more apparent. Just for illustration purpose, non-restrictive depictions of example embodiments are presented herein with reference to figures, in which:

DETAILED DESCRIPTION OF EMBODIMENTS

A lot of details are expounded in the following description for illustration purpose. However, those having ordinary skills in the art will appreciate that embodiments of the present disclosure may be implemented without these specific details. Hence, the present disclosure is not intended to be limited by the illustrated embodiments, but endowed the broadest scope consistent with principles and features described herein.

It should be appreciated that the terms "first", "second" and the like are only used to distinguish one element from another element. However, in fact, the first element may also be called the second element, and vice versa. In addition, it should be appreciated that "comprising" and "including" are only used to illustrate existence of the stated features, elements, functions and components, and do not exclude existence of one or more other features, elements, functions or components.

To facilitate illustration, in some embodiments of the present disclosure, snap deletion is used as an example for introducing a method or apparatus for controlling a background operation. However, as appreciated by those skilled in the art, embodiments of the present disclosure are not limited to being applied to snap deletion, but may be applied to any background operation having the similar problem.

Figure 1:
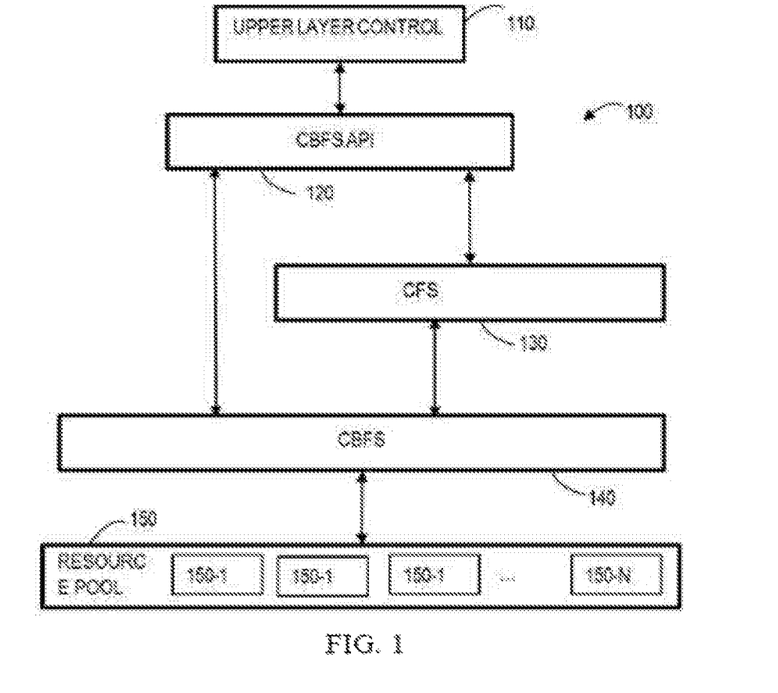
FIG. 1 illustrates a structural schematic diagram of an example storage system in which an embodiment of the present disclosure may be implemented.

FIG. 1 illustrates a schematic diagram of an example storage system 100 in which an embodiment of the present disclosure may be implemented. However, it should be appreciated that the specific structure of the storage system shown in FIG. 1 is not needed in some embodiments.

In the example storage system 100 of FIG. 1, an upper-layer control layer 110 processes I/O request, and interacts with a CBFS application program interface (API) layer 120. The CBFS API layer 120 performs a file storage-related operation through a common file system (CFS) layer 130 and/or CBFS layer 140. In addition, bottom-layer data storage in the storage system 100 is supported by a storage resource pool 150. The storage resource pool 150 may include a plurality of storage devices, for example, magnetic disks 151-*l* to 151-N as shown in the figure.

Conventionally, not only the I/O request processing but also several background operations, for example, snap deletion, tidying up of disk fragments, and so on should be performed. Performing of background operations also needs to occupy processing resources, for example, central processing unit (CPU) resource, so a lot of background operations might affect the processing of the I/O. On the other hand, background operations such as snap deletion facilitate reclaiming the storage space, and facilitate storage of new data. How to control the background operation to refrain it from causing adverse influence to the processing of I/O, and enable the storage resource to be used effectively is still an open question. For example, currently snap deletion is not quick enough for a large Logic Unit Number (LUN). This might be completed in several minutes or even several hours. In the worst case, poor performance might seriously affect the user's experience, particularly when the storage pool is almost full. Therefore, it is desirable to provide an effective mechanism to control the background operation such as snap deletion.

To ensure I/O performance, it is possible to throttle the background operation (e.g., snap deletion) only based on a count of arrived I/O. However, inventors of the present disclosure recognize that the I/O count cannot describe overload of the system accurately. Hence, the solution might fail to effectively use runtime resources, and may cause a poor snap deletion performance.

In addition, currently the snap deletion does not take usage situations of the storage pool, as well as optimization of snap deletion in the case that the storage pool is full, into account. This might cause the storage space unable to be reclaimed in time, and thereby cause the user not to be permitted to create a new snap.

An embodiment of the present disclosure provides a new solution for storage system management. In some embodiments, the load of the system, storage resource pool and the file system may be dynamically monitored by taking a plurality of factors into consideration, in order to evaluate a proper throttle level or priority level for background operations. Based on the throttle level, the number of threads, such as snap deletion, and a scheduling interval may be adjusted, to enable more efficient use of the resource. With some embodiments of the present disclosure, snaps may be deleted quickly, so that the storage space may be reclaimed in time without affecting the processing of arrived I/O of the host, for example, the arrived I/O is still under an acceptable CPU usage rate.

In addition, in some embodiments of the present disclosure, when the storage pool is almost full, a priority level of the snap deletion operation (e.g., the truncate thread for snap deletion) may be increased, for example, to make its priority level higher than that of I/O processing, so as to reclaim the storage space as soon as possible.

Figure 2A:
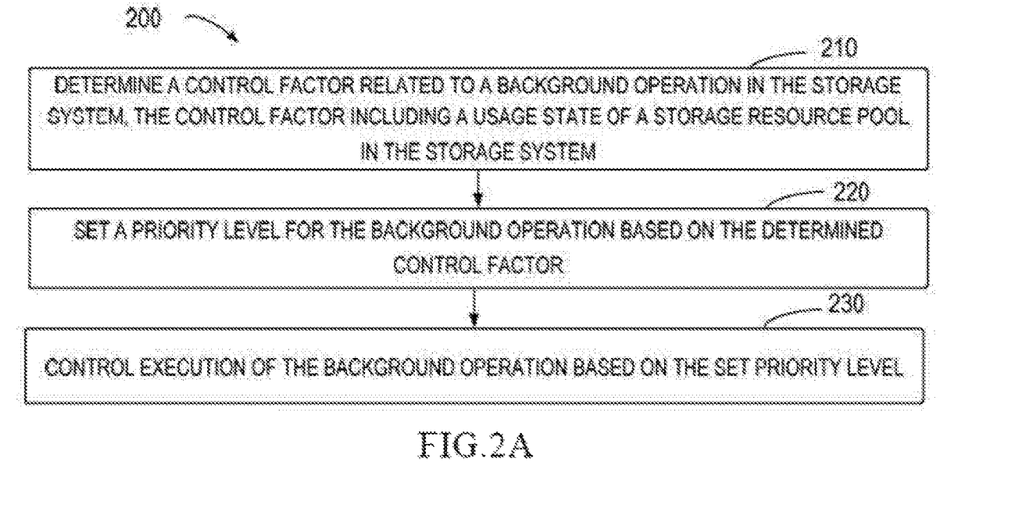
FIG. 2A illustrates a flow chart of a method for controlling a storage system according to an embodiment of the present disclosure.

Reference is made below to FIG. 2A to describe an example method 200 for controlling the storage system according to an embodiment of the present disclosure. The method may be implemented in the storage system 100 in FIG. 1, and to facilitate depictions, the embodiment of the method 200 will be described in conjunction with the storage system 100. However, it should be appreciated that the method 200 is not limited to be implemented in the specific example structure.

As shown in FIG. 2A, the method includes, at block 210, determining a control factor related to background operation in the storage system. As an example, the control factor includes, but not limited to, a usage state of the storage resource pool in the storage system. For example, at block 210, the control factor may be determined by periodically (e.g., per 10 seconds) querying for a free percentage of the storage resource pool.

In an embodiment, alternatively or additionally, the control factor may include a system-level load of the storage system 100, and/or, load associated with a file system (FS) of the storage system.

The system-level load of the storage system 100 may be represented as for example I/O ingestion, I/O response time and so on. In one embodiment, at block 210, the system-level load may be determined by, for example, obtaining I/O ingestion for each week. For example, the ingestion information may be collected via a CBFS 10 statistics function (represented as CBFSIOStats) in the CBFS API layer 120 shown in FIG. 1. Each entry in the ingestion information may be, for example, a ratio (for example a percentage) of the ingestion at the same hour of the same day last week relative to the ingest of the day.

Just for illustration, in some embodiments, Sunday may be defined as a start of a week (day=0). Therefore, entry [1][1] refers to a total ingestion occurs on Monday (day=1) of the first week. A percentage can also be obtained by comparing I/O load of a certain hour to that of the same time of last week. If the percentage exceeds an ingestion ratio threshold, this indicates that the current I/O ingestion is heavy. For illustration rather than limitation, the ingestion ratio threshold may have a default value 10, and the value may be changed. It should be noted that in another embodiment, I/O ingestion table for a time interval shorter or longer than one week may be obtained.

In another example, at block 210, collection of I/O response time statistics may be implemented for example at the CBFS API layer, to determine a system-level load as a control factor. For example, an average read response time within one minute (or other shorter or longer time periods) may be collected during a truncation operation of snaps.

In another embodiment, alternatively or additionally, the control factor may include a FS-level load associated with the storage system. The FS-level load may be represented by, for example, a free degree of a file log or a data log. For example, at block 210, a free percentage of a file log (e.g., UFSlog) for a FS may be obtained as the control factor. The UFSLog is a log mechanism, which traces metadata and is used to ensure consistency of the file system when the system is restarted or power off. A high usage rate of the UFSlog means a rapid increase of arrived I/Os.

In an example, the free percentage of UFSlog of a FS may be used together with the free percentage of a system log (Syslog) for all FSs, to evaluate the load of the FS, namely, usage situations. Syslog is a global log and is used to manage a total log size of all file systems.

In addition, a total free percentage of the file system may be evaluated by considering a free degree (e.g., free percentage) of a data log (e.g., DataLog). Persistent File Data Cache (PFDC) technology is designed to provide a high I/O throughput and a low latency. This technology achieves this performance by shifting a metadata update overhead from a client I/O path to a background thread. In PFDC, data is first written in a fast persistent storage in a small size format (e.g., DataLog format). Hence, the DataLog traces the user data.

In an example embodiment, weights for UFSlog usage situations and DataLog usage situation may be set respectively, to obtain a total use situation for the file system by combining the two factors. As a non-restrictive example, at block 210, the total usage situation (vFreePercent) of the file system may be obtained as the control factor through the following equation:

$$vFreePercent=(vDLPercent*vDLRatio+ vUFSLogPercent*vUFSLogRatio)/(vDLRatio+ vUFSLogRatio) \qquad (1)$$

where vDLPercent represents free degree of DataLog (wherein the free degree of file data cache (FDC) may be taken into consideration), and UFSLogPercent represents free degree of UFSlog. In some embodiments, vDLRatio and vUFSLogRatio may be set as vDLRatio=2 and vUFSLogRatio=1 respectively to indicate that the weight of the usage situation for DataLog is 2, and the weight of usage situation for UFSlog is 1.

Figure 2B:
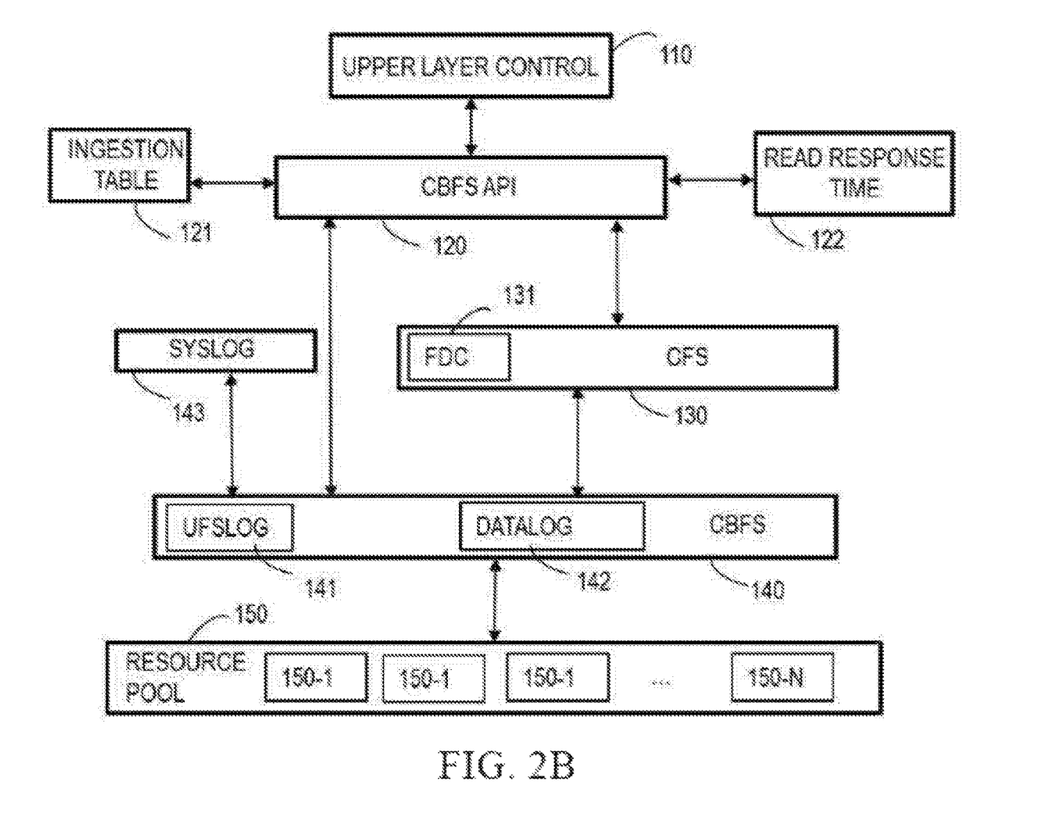
FIG. 2B illustrates an example for determining a control factor according to an embodiment of the present disclosure.

FIG. 2B illustrates an example for obtaining a control factor through layers of the storage system 100. As shown in FIG. 2B, I/O ingestion table 121 and I/O read response time 122 may be obtained through the CBFS API layer 120; a file data cache situation 131 may be obtained through a CFS layer 130; and usage situations for UFSLog 141, SysLog 143 and DataLog 142 may be obtained through a CBFS layer 140.

Now returning to FIG. 2A, at block 220, a priority level for a background operation is set based on the determined control factor. In some embodiments, the background operation may include, but not limited to, snap deletion, tidying up of disk fragments and so on.

For illustration rather than limitation, at block 220, the priority level of the background operation may be reduced in response to the control factor indicating the free degree of the storage resource pool 150 of the storage system 100 is above a threshold degree, and/or the priority level of the background operation may be kept unchanged or increased in response to the control factor indicating the free degree of the storage resource pool 150 is below the threshold degree. For example, once the percentage of the resource pool 150 is below the storage pool threshold (e.g. the default value is 5%), it may be believed that the storage resource needs to be reclaimed as quickly as possible, and therefore snap deletion (e.g., the truncate operation) should be performed as quickly as possible. In this case, at block 220, a high priority level may be set for a truncate operation, and throttling for the truncate operation may not be performed (e.g., set the throttle level as 0). It should be appreciated that truncate is an example of the technology for deleting a file, and it delete the file by reducing the size of the file, wherein the file is associated with an LUN. In this technology, when one snap is deleted, a size of the associated LUN is truncated to zero. However, the present disclosure is not limited to performing deletion of the file (e.g., the snap) using this technology.

In an embodiment, alternatively or additionally, at block 220, the priority level of the background operation may be reduced in response to the control factor indicating that the system-level I/O load (e.g., I/O ingestion) of the storage system 100 is above a threshold load, and/or, to the priority level of the background operation may be kept unchanged or increased in response to the control factor indicating the system-level I/O load of the storage system 100 is below the threshold load.

In another embodiment, at block 220, the priority level of the background operation may be reduced in response to the control factor indicating that a ratio of the current I/O load of the storage system 100 to I/O load in a previous time period is above a first threshold ratio, and/or, the priority level of the background operation may be kept unchanged or increased, in response to the control factor indicating the ratio of the current I/O load of the storage system 100 to I/O load in the previous time period is below the first threshold ratio. For example, if the I/O ingestion percentage exceeds the ingestion ratio threshold, it is determined that the current I/O ingestion is heavy, and at block 220, in response to the determination, a lower priority level value for the background operation may be set, so as to throttle the background operation.

As another example, at block 220, the priority level of the background operation may be reduced in response to the control factor indicating that the I/O response time of the storage system 100 is above a threshold time, and/or, the priority level of the background operation may be kept unchanged or increased, in response to the control factor indicating the I/O response time of the storage system is below the threshold time. For example, if I/O average response time of the system is greatly longer than a value before the truncate operation begins, this indicates that the I/O processing is obviously affected by the truncate operation, and in this case, a lower priority level for the truncate operation may be set to ensure that the I/O thread is served first.

In another example, the priority level of the background operation may be reduced in response to the control factor indicating that a ratio of the current I/O response time of the storage system to the I/O response time before the background operation begins is above a second threshold ratio; and/or, the priority level of the background operation may be kept unchanged or increased, in response to the control factor indicating the ratio of the current I/O response time of the storage system to the I/O response time before the background operation begins is below the second threshold ratio. For example, if a ratio of an average I/O response time during truncation to the I/O response time before the truncation begins is larger than a default response time ratio threshold (a second threshold ratio), the truncate may be paused by setting a lower priority level for the truncate operation, to ensure that the I/O is served first. An example of the default I/O response time ratio threshold (the second threshold ratio) is 150%, and the value may be changed through a command.

As stated above, in some embodiments, the control factor determined at block 210 may alternatively or additionally indicate the load situation of the FS level. In one of such embodiments, at block 220, the priority level of the background operation may be reduced in response to the control factor indicating that a free degree of a log of a FS associated with the storage system 100 is below a first threshold free degree; and/or, the priority level of the background operation may be kept unchanged or increased, in response to the control factor indicating that the free degree of the log of FS is above the first threshold free degree. For example, a high UFSLog usage rate (equivalent to a low free degree) means that the arrived IO increases rapidly. Therefore, in this case, at block 210, flushing of dirty metadata to the magnetic disk may be accelerated, to reduce the usage rate of USFLog, and the truncate operation (namely, set a lower priority level for the truncate) may be throttled to release the CPU resource to serve the arrived I/O.

Alternatively or additionally, at block 220, the priority level of the background operation may be reduced in response to the control factor indicating that a free degree of data cache in the storage system 100 (e.g., DataLog free percentage) is below a second threshold free degree; and/or, the priority level of the background operation may be kept unchanged or increased in response to the control factor indicating that the free degree of the data cache in the storage system 100 is above the second threshold free degree.

In a further embodiment, at block 220, the priority level of the background operation may be determined based on both the free degree of data cache and the free degree of the log of the FS. For example, the priority level of the background operation may be reduced in response to the control factor indicating that a weighted sum (e.g., a weighted sum as calculated according to the equation (1)) of the free degree of the data cache in the storage system 100 and the free degree of the log of FS system associated with the storage system is below a threshold sum; and/or, the priority level of the background operation may be kept unchanged or increased in response to the control factor indicating that the weighted sum is above the threshold sum. That is, once the weighted sum of free percentages is below a given threshold, the priority level of the background operation (e.g., truncate) may be reduced, i.e., the throttle level of the background operation may be increased. The throttle level indicates a degree of throttle applied to the background operation, and therefore indicates the priority level of the background operation.

In general, in some embodiments, the throttle level for the background operation may be defined as a function of a plurality of control factors, and at block 220, the priority level/throttle level of the background operation may be determined based on the function. The plurality of control factors for example may include, but is not limited to, one or more of the following: DataLog free degree (e.g., DataLog percentage), USFLog free degree (e.g., USFLog percentage), storage pool free degree (storage pool free percentage), I/O ingestion percentage, read I/O number percentage and so on.

In an example, the throttle level may be determined based on for example a function (e.g., represented as f ( )) of the DataLog percentage, USFLog percentage, storage resource pool free percentage, I/O ingestion percentage and read I/O number percentage.

Alternatively, other functions may be defined to determine the throttle level respectively according to one or more of the USFLog percentage, storage resource pool percentage, I/O ingestion percentage and read I/O number percentage.

In some embodiments, at block 220, the priority level for the background operation may be set based on the lowest priority level (corresponding to the highest throttle level) predetermined for the background operation. For example, if the throttle level calculated based on the function f ( ) is larger than the predetermined highest throttle level, at block 220, the throttle level may be set as the highest throttle level, namely set the priority level as a predetermined lowest priority level.

Figure 3:
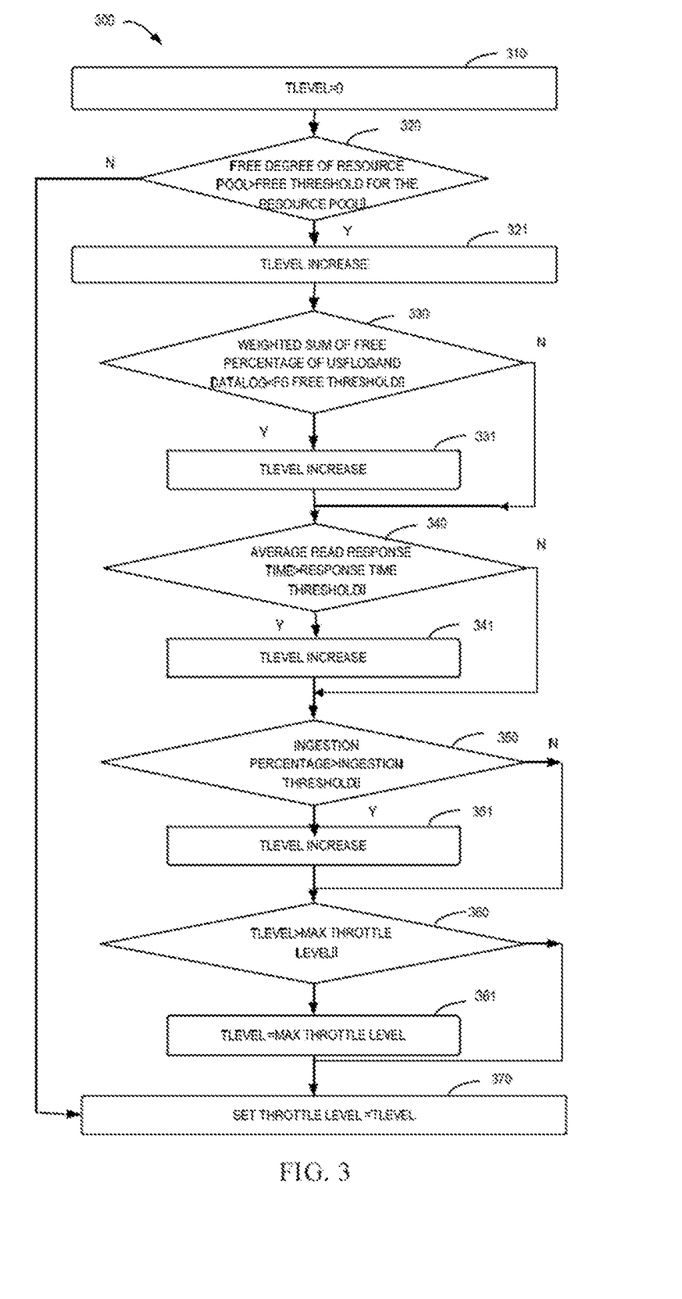
FIG. 3 illustrates a flow chart of a method for setting a throttle level for a background operation according to an embodiment of the present disclosure.

In some further embodiments, a throttle level for the background operation may be adjusted gradually based on different control factors, the throttle level corresponding to the priority level. For example, if the free degree of the storage resource pool is below a threshold degree, the priority level of the background operation is set to be higher than the priority level of I/O; if the free degree of the storage resource pool is above the threshold degree, the priority level of the background operation may be reduced, and gradually adjusted based on at least one of the I/O load of the storage system, the I/O response time, the free degree of the log of the file system associated with the storage system, and the lowest priority level for the background operation, to determine the priority level for the background operation. FIG. 3 shows an example method 300 for determining the throttle level in this manner. The method 300 may be utilized to execute the operation of block 220 of FIG. 2A. In the method 300, an initial throttle level may be set as 0. Then checking is performed as to whether each considered control factor reaches a corresponding threshold. If the control factor reaches a predetermined threshold, the throttle level is increased. In addition, a finally-obtained throttle level is constrained by a maximum throttle level. In a special case, if the storage pool is shown to be almost full, the truncate operation is executed with a high priority level (low throttle level) to reclaim the storage space, no matter whether the system is busy.

Specifically, as shown in FIG. 3, at block 310, the initial throttle level may be set as 0. At block 320, it is determined whether the resource pool free percentage is larger than the resource pool threshold. If the resource pool free percentage is larger than the resource pool threshold, the throttle level is increased at block 320, otherwise the throttle level is set as the final throttle level at block 370.

At block 330, it is determined as to whether the FS free percentage is larger than a free degree threshold. If the FS free percentage is smaller than a free degree threshold, continue to increase the throttle level at block 331, otherwise proceed to block 340, where determination is made as to whether the read I/O response time is larger than a response time threshold.

If it is determined at block 340 that the I/O response time is larger than the response time threshold, continue to increase the throttle level at block 341. Otherwise, determine whether the I/O ingestion percentage is larger than an ingestion threshold at block 350.

If it is determined at block 350 that the I/O ingestion percentage is larger than an ingestion threshold, continue to increase the throttle level at block 351. Otherwise, determine whether the calculated throttle level is larger than the highest throttle level at block 360.

If the calculated throttle level is already larger than the highest throttle level, set the throttle level to be the highest throttle level at block 361, otherwise determine the calculated throttle level as the final throttle level.

It should be noted that embodiments of the present disclosure are not limited to the use of the control factor as shown in FIG. 3, and are not limited to the order of operations shown in FIG. 3.

Returning to FIG. 2A, at block 230, the execution of the background operation may be controlled based on the priority level for the background operation set at block 220. A high priority level (or low throttle level) means that the load of the storage array is at an acceptable level, so that more background operation threads and shorter interval may be used to accelerate the background operation, for example, to accelerate the truncate, vice versa. Hence, in an embodiment, the number of threads for the background operation may be determined based on the priority level, and execution of the background operation may be controlled based on the determined number of threads.

For example, at block 220, the throttle level (e.g., represented as TLevel) may be obtained through a defined function (e.g., getTruncateThrottleLevel( )); at block 230, the number of threads corresponding to a given throttle level TLevel may be obtained by using another function (e.g., gTruncateThrottleThread[TLevel]) or by looking up a table. For example, the function or table may statistically define a thread of a sub-leafIB task for a specific throttle level.

Additionally or alternatively, in another embodiment, scheduling information (e.g., scheduling interval for background operations and times of background operation yielding CPU) for the background operation may be determined based on the priority level, and the execution of the background operation may be controlled based on the determined scheduling information for background operations. For example, a sleep time corresponding to a given throttle level TLevel may be obtained by using a defined function (e.g., gTruncateThrottleSleepTime[TLevel]) or by looking up a table. For example, the function or table may statistically define a sleep time for a specific throttle level.

Another aspect of the present disclosure further provides a control device for controlling a storage system. The control device may be implemented for example inside or outside the storage system 100 in FIG. 1. The control device may include a corresponding control unit, to execute operations of blocks 210-230 of the above reference method 200 respectively. For example, a control unit in the control device may use the method 300 shown in FIG. 3 to complete the function of block 220. The above operations described with reference to methods 200 and 300 also apply to the control device, and will not be detailed any more here.

Figure 4:
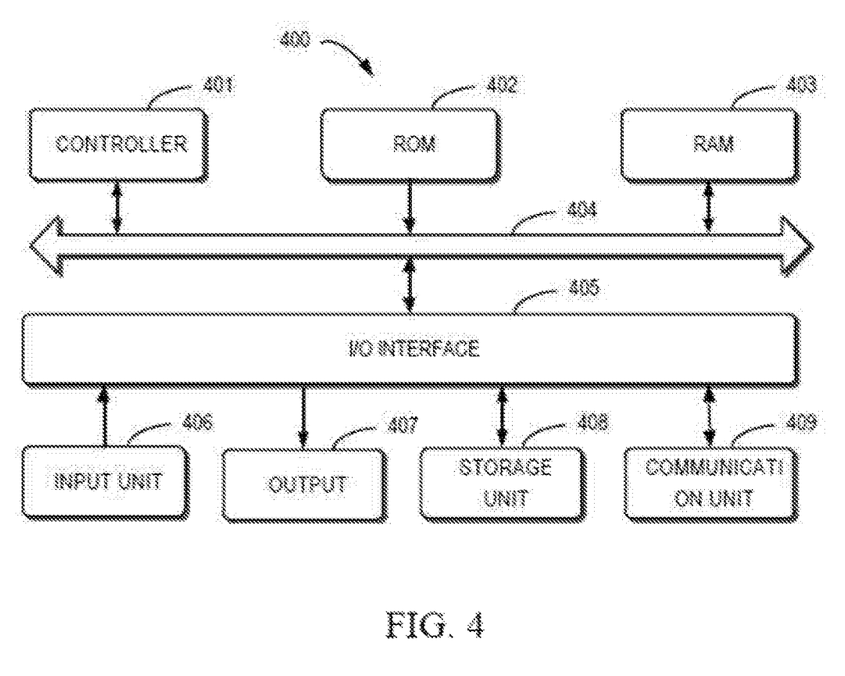
FIG. 4 illustrates an exemplary structural diagram of a device according to an embodiment of the present disclosure.

FIG. 4 illustrates an exemplary structural diagram of an electronic device 400 that may be used to implement an embodiment of the present disclosure. As shown in FIG. 4, the electronic device 400 comprises a controller or processing unit (e.g., CPU) 401 which may perform various appropriate actions and processing based on programs stored in a read-only memory (ROM) 402 and/or a random access memory (RAM) 403. The ROM 402 and/or RAM 403 may store various programs and data required by operation of the electronic device 400. The controller 401, ROM 402 and RAM 403 are connected to one another via a bus 404. Specifically, the electronic device 400 may further comprise one or more specific processing units (not shown) which may also be connected to the bus 404.

An input/output (I/O) interface 405 is also connected to the bus 404. A plurality component in the electronic device 400 are connected to the I/O interface 405, including: an input unit 406 such as a keyboard, a mouse and the like; an output unit 407 including various kinds of displays and a loudspeaker, etc.; a memory unit 408 including a magnetic disk, an optical disk, etc.; a communication unit 409 such as a network card, a modem, and a wireless communication transceiver, etc. The communication unit 409 allows the electronic device 400 to exchange information/data with other devices through a computer network such as the Internet and/or various kinds of telecommunications networks.

In some embodiments, the controller 401 may be configured to execute various processes and processing described above, e.g., process 300 and method 200. For example, in some embodiments, the process 300 or method 200 may be implemented as a computer software program that is tangibly embodied on a machine readable medium, e.g., the storage unit 408. In some embodiments, part or all of the computer program may be loaded and/or mounted onto the electronic device 400 via ROM 402 and/or communication unit 409. When the computer program is loaded to the RAM 403 and executed by the CPU 401, one or more operations of the process 300 and method 200 as described above may be executed. Alternatively, in other embodiments, the controller 401 may also be configured in any other suitable manners to implement the above process/method.

Particularly, according to embodiments of the present disclosure, the processes described above with reference to FIG. 2A to FIG. 3 may be implemented as a computer program product. The computer program product may be tangibly stored on a non-transitory computer readable storage medium and include computer-executable instructions which, when executed, enable a machine to implement aspects of the present disclosure.

The computer readable storage medium can be a tangible device that may store instructions for use by an instruction execution device. The computer readable storage medium may be, for example, but is not limited to, an electronic storage device, a magnetic storage device, an optical storage device, an electromagnetic storage device, a semiconductor storage device, or any suitable combination thereof. A non-exhaustive list of more specific examples of the computer readable storage medium includes: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions for carrying out operations of the present invention may be assembler instructions, instruction-set-architecture (ISA) instructions, machine instructions, machine related instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet via an Internet Service Provider). In some embodiments, electronic circuitry including, for example, programmable logic circuitry, field-programmable gate arrays (FPGA), or programmable logic arrays (PLA) may be customized by utilizing state information of the computer readable program instructions. The electronic circuitry may execute computer readable program instructions, in order to perform aspects of the present invention.

Aspects of the present invention are described herein with reference to flowchart illustrations and/or block diagrams of methods, apparatus, and computer program products according to embodiments of the invention. It will be understood that each block of the flowchart and/or block diagrams, and combinations of blocks in the flowchart and/or block diagrams, may be implemented by computer readable program instructions.

Embodiments of the present disclosure have already been described for illustration purpose, but the present disclosure is not intended to be limited thereto. Without departing from the essence of the present disclosure, all modifications and variations all fall within the protection scope of the present disclosure as defined by the appended claims.

In addition, the present disclosure further provides performance evaluation results of some proposed solutions. The following is performance comparison between an embodiment of the present disclosure and a conventional solution. In this embodiment, the throttle level for the truncate operation is determined according to the method shown in FIG. 3, whereas the conventional method performs control of the truncate only based on I/O count. Table 1 and Table 2 show comparison results for the case where an inline compression (ILC) is on and off respectively, and the two groups of results both show that embodiments of the present disclosure enable the truncate operation to be executed more quickly than the conventional solution, and meanwhile the I/O response time and the CPU usage are at an acceptable level.

TABLE 1

Comparison results when the ILC is on

| Input/Output Operations Per Second (IOPS) 10000 | Truncate Duration (sec) | Avg. RT (ms) during truncate | Avg. CPU usage (%) during truncate |
|---|---|---|---|
| Conventional solution | 250.98 | 15.20 | 34.90 |
| Proposed Solution | 76.61 | 16.79 | 40.88 |

TABLE 2

Comparison results when the ILC is off

| IOPS 10000 | Truncate Duration (sec) | Avg. RT (ms) during truncate | Avg. CPU usage (%) during truncate |
|---|---|---|---|
| Conventional solution | 253.02 | 14.85 | 31.24 |
| Proposed Solution | 52.12 | 16.06 | 35.41 |

We claim:

1. A method for controlling a storage system, comprising:
   determining a plurality of control factors related to a background operation in the storage system, the control factors including a usage state of a storage resource pool in the storage system and input/output (I/O) response time of the storage system;
   setting a priority level for the background operation based on the determined control factor by performing the steps of:
      in response to a first control factor indicating that a free degree of the storage resource pool is below a threshold degree, setting the priority level of the background operation to be higher than the priority level of I/O;
      in response to the first control factor indicating that the free degree of the storage resource pool is above the threshold degree, reducing the priority level of the background operation and gradually adjusting the priority level of the background operation based at least on a second control factor, wherein gradually adjusting the priority level of the background operation based at least on the second control factor includes:
         in response to the second control factor indicating that the I/O response time of the storage system is above a threshold time, reducing the priority level of the background operation; and
         in response to the second control factor indicating that the I/O response time of the storage system is below the threshold time, maintaining or increasing the priority level of the background operation; and
   controlling execution of the background operation based on the set priority level, including:
      determining scheduling information and a number of threads for the background operation based on the set priority level; and
      controlling execution of the background operation based on the determined scheduling information and number of threads for the background operation.

2. The method according to claim 1, wherein the control factors further comprises at least one of system-level load of the storage system and load of a file system associated with the storage system.

3. The method according to claim 1, wherein the background operation comprises snap deletion.

4. The method according to claim 1, wherein the scheduling information includes:
   a scheduling interval for the background operation; and
   times of the background operation yielding a central processing unit (CPU).

5. The method according to claim 2, wherein setting the priority level for the background operation further comprises:
   in response to a third control factor indicating that I/O load of the storage system is above a threshold load, reducing the priority level of the background operation; and
   in response to the third control factor indicating that the I/O load of the storage system is below the threshold load, maintaining or increasing the priority level of the background operation.

6. The method according to claim 2, wherein setting the priority level for the background operation further comprises:
   in response to a third control factor indicating that a ratio of current I/O load of the storage system to I/O load in a previous time period is above a threshold ratio, reducing the priority level of the background operation; and
   in response to the third control factor indicating that the ratio of the current I/O load of the storage system to the I/O load in the previous time period is below the first threshold ratio, maintaining or increasing the priority level of the background operation.

7. The method according to claim 1, wherein setting the priority level for the background operation further comprises:
   in response to a third control factor indicating that a ratio of current I/O response time of the storage system to I/O response time before the background operation began is above a threshold ratio, reducing the priority level of the background operation; and
   in response to the third control factor indicating the ratio of the current I/O response time of the storage system to the I/O response time before the background operation began is below the threshold ratio, maintaining or increasing the priority level of the background operation.

8. The method according to claim 2, wherein setting the priority level for the background operation further comprises:
   in response to a third control factor indicating that a free degree of a log of the file system associated with the storage system is below a threshold free degree, reducing the priority level of the background operation; and
   in response to the third control factor indicating that the free degree of the log of the file system is above the first threshold free degree, maintaining or increasing the priority level of the background operation.

9. The method according to claim 1, wherein setting the priority level for the background operation further comprises:

in response to a third control factor indicating that a free degree of a data cache in the storage system is below a threshold free degree, reducing the priority level of the background operation; and in response to the third control factor indicating that the free degree of the data cache in the storage system is above the second threshold free degree, maintaining or increasing the priority level of the background operation.

10. The method according to claim 2, wherein setting the priority level for the background operation further comprises:

in response to a third control factor indicating that a weighted sum of a free degree of a data cache in the storage system and a free degree of a log of the file system associated with the storage system is below a threshold sum, reducing the priority level of the background operation; and in response to the third control factor indicating that the weighted sum is above the threshold sum, maintaining or increasing the priority level of the background operation.

11. The method according to claim 1, wherein setting the priority level for the background operation further comprises:

setting the priority level for the background operation further based on a lowest priority level predetermined for the background operation.

12. An electronic device, comprising:

at least one processor; and at least one memory coupled to the at least one processer and including computer program codes stored therein to be executed by the at least one processor, wherein the computer program codes are configured for the execution of:

determining a plurality of control factors related to a background operation in a storage system, the control factor including a usage state of a storage resource pool in the storage system and input/output (I/O) response time of the storage system;

setting a priority level for the background operation based on the determined control factor by performing the steps of:

in response to a first control factor indicating that a free degree of the storage resource pool is below a threshold degree, setting the priority level of the background operation to be higher than the priority level of I/O;

in response to the first control factor indicating that the free degree of the storage resource pool is above the threshold degree, reducing the priority level of the background operation and gradually adjusting the priority level of the background operation based at least on a second control factor, wherein gradually adjusting the priority level of the background operation based at least on the second control factor includes:

in response to the second control factor indicating that the I/O response time of the storage system is above a threshold time, reducing the priority level of the background operation; and in response to the second control factor indicating that the I/O response time of the storage system is below the threshold time, maintaining or increasing the priority level of the background operation; and controlling execution of the background operation based on the set priority level, including:

determining scheduling information and a number of threads for the background operation based on the set priority level; and controlling execution of the background operation based on the determined scheduling information and number of threads for the background operation.

13. A computer program product for controlling a storage system, the computer program product comprising a non-transitory computer readable medium encoded with computer-executable program code, the code configured to enable the execution of:

determining a plurality of control factors related to a background operation in the storage system, the control factor including a usage state of a storage resource pool in the storage system and input/output (I/O) response time of the storage system;

setting a priority level for the background operation based on the determined control factor by performing the steps of:

in response to a first control factor indicating that a free degree of the storage resource pool is below a threshold degree, setting the priority level of the background operation to be higher than the priority level of I/O;

in response to the first control factor indicating that the free degree of the storage resource pool is above the threshold degree, reducing the priority level of the operation and gradually adjusting the priority level of the background operation based at least on a second control factor, wherein gradually adjusting the priority level of the background operation based at least on the second control factor includes:

in response to the second control factor indicating that the I/O response time of the storage system is above a threshold time, reducing the priority level of the background operation; and in response to the second control factor indicating that the I/O response time of the storage system is below the threshold time, maintaining or increasing the priority level of the background operation; and controlling execution of the background operation based on the set priority level, including:

determining scheduling information and a number of threads for the background operation based on the set priority level; and controlling execution of the background operation based on the determined scheduling information and number of threads for the background operation.

* * * * *